United States Patent
Ishikawa

(10) Patent No.: US 8,917,419 B2
(45) Date of Patent: Dec. 23, 2014

(54) IMAGE PROCESSING APPARATUS AND CONTROL METHOD THEREOF

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/541,978

(22) Filed: Jul. 5, 2012

(65) Prior Publication Data

US 2013/0010314 A1  Jan. 10, 2013

(30) Foreign Application Priority Data

Jul. 7, 2011   (JP) .................................. 2011-150892

(51) Int. Cl.
*H04N 1/405* (2006.01)

(52) U.S. Cl.
CPC .................................. *H04N 1/4055* (2013.01)
USPC ......................................... 358/1.9; 358/3.06

(58) Field of Classification Search
USPC .......................... 358/3.06, 3.27, 1.9, 400, 448
See application file for complete search history.

(56) References Cited

U.S. PATENT DOCUMENTS

| 2006/0279589 A1* | 12/2006 | Yasutomi et al. | 347/6 |
| 2008/0117464 A1* | 5/2008 | Crounse | 358/3.03 |
| 2011/0122451 A1* | 5/2011 | Tsutsumi et al. | 358/3.06 |
| 2012/0147431 A1* | 6/2012 | Kashibuchi | 358/3.27 |

FOREIGN PATENT DOCUMENTS

| JP | 9-238259 A | 9/1997 |
| JP | 2005-252583 A | 9/2005 |

* cited by examiner

*Primary Examiner* — Jerome Grant, II
(74) *Attorney, Agent, or Firm* — Canon USA Inc IP Division

(57) ABSTRACT

An image processing apparatus that converts input image data into printable image data is provided. The apparatus performs screen processing on the input image data, and determines whether moiré occurs in screen image data generated by the screen processing unit for a target pixel in the input image data. Depending on the determination result made by the determination unit, the apparatus outputs one of a screen pixel value in the screen image data for the target pixel and a value obtained by converting an input pixel value into a printable pixel value based on intermediate data, as a value of the target pixel in the printable image data, the intermediate data being generated by replacing a screen pixel in the screen image data that is determined to have moiré by the determination unit with the input pixel value in the input image data.

19 Claims, 9 Drawing Sheets

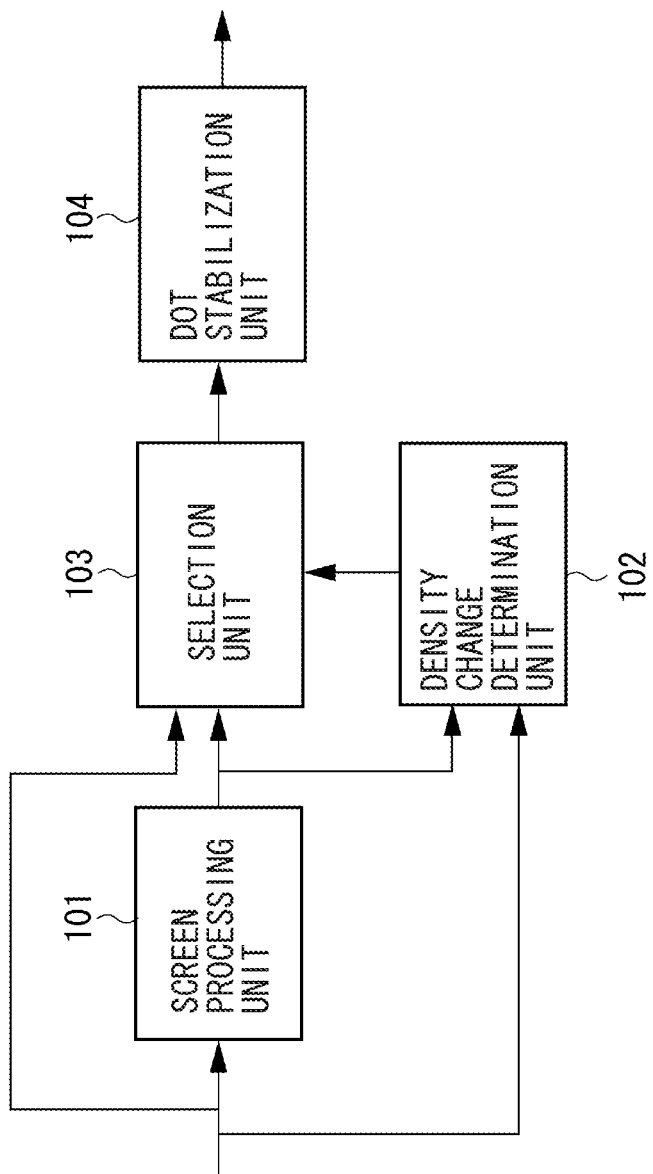

| 21 | 13 | 25 | 19 | 7  | 11 | 18 | 28 | 21 | 13 | 25 | 19 |
| 9  | 5  | 17 | 27 | 15 | 23 | 29 | 16 | 9  | 5  | 17 | 27 |
| 0  | 1  | 10 | 22 | 31 | 24 | 12 | 4  | 0  | 1  | 10 | 22 |
| 3  | 2  | 6  | 14 | 26 | 30 | 20 | 8  | 3  | 2  | 6  | 14 |
| 7  | 11 | 18 | 28 | 21 | 13 | 25 | 19 | 7  | 11 | 18 | 28 |
| 15 | 23 | 29 | 16 | 9  | 5  | 17 | 27 | 15 | 23 | 29 | 16 |
| 31 | 24 | 12 | 4  | 0  | 1  | 10 | 22 | 31 | 24 | 12 | 4  |
| 26 | 30 | 20 | 8  | 3  | 2  | 6  | 14 | 26 | 30 | 20 | 8  |
| 21 | 13 | 25 | 19 | 7  | 11 | 18 | 28 | 21 | 13 | 25 | 19 |
| 9  | 5  | 17 | 27 | 15 | 23 | 29 | 16 | 9  | 5  | 17 | 27 |
| 0  | 1  | 10 | 22 | 31 | 24 | 12 | 4  | 0  | 1  | 10 | 22 |
| 3  | 2  | 6  | 14 | 26 | 30 | 20 | 8  | 3  | 2  | 6  | 14 |
| 7  | 11 | 18 | 28 | 21 | 13 | 25 | 19 | 7  | 11 | 18 | 28 |
| 15 | 23 | 29 | 16 | 9  | 5  | 17 | 27 | 15 | 23 | 29 | 16 |

FIG. 7

| 3 / 80 | 20 / 80 | 3 / 80 |
|---|---|---|
| 14 / 80 | * | 14 / 80 |
| 3 / 80 | 20 / 80 | 3 / 80 |

IMAGE PROCESSING APPARATUS AND CONTROL METHOD THEREOF

BACKGROUND OF THE INVENTION

1. Field of the Invention

The present invention relates to a technology to appropriately correct a result of screen processing to output high quality halftone images.

2. Description of the Related Art

In recent years, image data has been commonly printed out after being processed by a computer. Sometimes, however, an output apparatus such as a printer or a display offer a tone number that is smaller than that of image data. A tone number is related to the number of tones that an output device can produce. Accordingly, halftone processing is performed to convert the tone number of the image data into the one that is acceptable in the output apparatus for expression.

As an examples of the halftone processing, screen processing (ordered dither method) is known, in which an output value is determined by comparing image data to a threshold that periodically changes. A screen image is obtained by the screen processing in which tone is expressed by area coverage modulation. The screen image has high quality especially at its flat area having little change in tone due to uniform halftone dots at equal intervals. However, after the screen processing, the image data often has visible repetition patterns (moiré), which may lead to degradation of image quality. Further, if the image includes thin lines, the lines cannot be well reproduced depending on their density and angle.

Techniques have been discussed to suppress the degradation of image quality and obtain good results from the screen processing. Examples of the techniques include a method to suppress moiré by detecting positions in an image where moiré is likely to occur, and removing high frequency components that cause moiré from areas where moiré is likely to occur before halftone processing (see Japanese Patent Application Laid-Open No. 9-238259).

Further, combination of the screen processing (ordered dither method) and an error diffusion method has been also discussed. For example, the combination can be used to reduce error bias before and after a dither process (see Japanese Patent Application Laid-Open No. 2005-252583).

However, in the method described in Japanese Patent Application Laid-Open No. 9-238259, high frequency components are eliminated at some areas while generation of moiré is reduced. The elimination of high frequency components from edge areas having a middle tone level may result in lower contrast at the edge areas and a faint image as a whole and desirable image quality is not obtained.

In addition, the method described in Japanese Patent Application Laid-Open No. 2005-252583 selects one of the dither processing and the error diffusion processing, as processing to be performed on each pixel. However, the selection of appropriate halftone processing requires complicated steps.

SUMMARY OF THE INVENTION

The present invention is directed to provide a simple method to appropriately correct the screen processing (ordered dither method) to obtain good results in halftone processing.

According to an aspect of the present invention, an image processing apparatus that converts input image data into printable image data is provided. The image processing apparatus according to the present invention performs the screen processing on the input image data, and determines whether moiré occurs in screen image data generated by the screen processing unit for a target pixel in the input image data. Depending on the determination result made by the determination unit, the apparatus outputs one of a screen pixel value in the screen image data for the target pixel and a value obtained by converting an input pixel value into a printable pixel value based on intermediate data, as a value of the target pixel in the printable image data, the intermediate data being generated by replacing a screen pixel in the screen image data that is determined to have moiré by the determination unit with the input pixel value in the input image data.

According to the above feature, the simple method of the present invention enables appropriate correction of results by the screen processing to obtain good results in halftone processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a structure of an image processing unit.

FIGS. 2A, 2B, and 2C are block diagrams illustrating in detail the density change determination unit in FIG. 1.

FIG. 3 schematically illustrates screen processing.

FIG. 7 illustrates a table of coefficients used by the determination unit in FIG. 6.

DESCRIPTION OF THE EMBODIMENTS

Figure 2A:
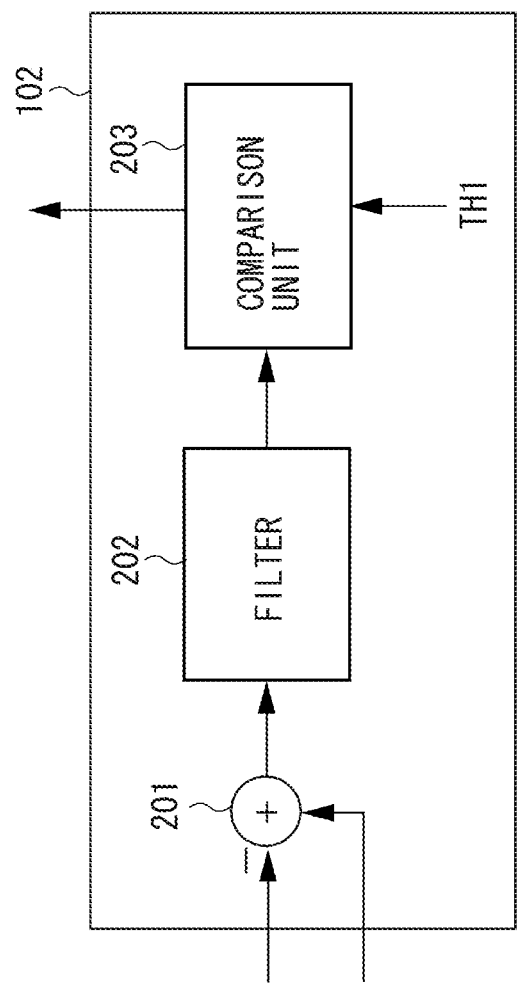

Various exemplary embodiments, features, and aspects of the invention will be described in detail below with reference to the drawings.

The structures in the following exemplary embodiment are only illustrative, and the present invention is not limited to the illustrated structures.

FIG. 1 is a block diagram illustrating a structure of an image processing unit that is applicable to a first exemplary embodiment. The image processing unit in FIG. 1 converts image data that is input thereto (hereinafter, referred to as input image data) into halftone image data having a tone number smaller than that of the input image data. The image processing unit in FIG. 1 includes a screen processing unit 101, a density change determination unit 102, an image data selection unit 103, and a dot stabilization unit 104. The following description outlines these components.

The screen processing unit 101 performs screen processing (ordered dither processing) on the input image data to convert the data into halftone image data having a tone number smaller than that of the input image data (hereinafter, referred to as screen image data). The screen processing unit 101 compares a value of each input pixel in the screen image data with a corresponding threshold to quantize it. Hereinafter, the value of each pixel quantized by the screen processing unit is referred to as screen pixel value. The screen image data is composed of screen pixel values for each pixel. In other words, the screen processing unit 101 converts the input pixel values constituting the input image data into screen pixel values constituting the screen image data through the screen processing.

In the present exemplary embodiment, the screen processing unit 101 binarizes the input image data. The screen processing unit 101 converts the data so that the resultant data has a tone number that is acceptable for reproduction in a target image forming apparatus such as a printer. In other words, the screen image data after quantization by the screen processing unit 101 is stable data in outputting the dots.

Generally, screen image data is expressed in a number of bits which is smaller than a number of bits used to express the input image data. However, in the present exemplary embodiment, a value is output which corresponds to representative quantization value converted into a tone number of input image data. In other words, in a case that the input image data is expressed by 8 bits (0 to 255), the value 0 or 255 is output after the screen processing.

The density change determination unit 102 detects density change (i.e., moiré) occurring in the screen image data, based on the difference between the input image data and the screen image data obtained by the screen processing. The density change determination unit 102 will be described in detail later.

The selection unit 103 selects one of a screen pixel value and an input pixel value for each pixel, based on the determination result made by the density change determination unit 102. The selection unit 103 selects an input pixel value for a pixel which was determined to have a larger density change. On the other hand, the selection unit 103 selects a screen pixel value output from the screen processing unit 101 for a pixel which was determined to have a smaller density change. In other words, in the screen image data obtained by the screen processing unit 101, the screen pixel value of a pixel having a larger density change after the screen processing is replaced with an input pixel value. Through the replacement, intermediate data can be obtained, from which the moiré caused by the screen processing is eliminated.

The intermediate data has a stable configuration obtained in the screen processing performed by the screen processing unit 101. Each pixel value of the intermediate data is 0 or a positive value. However, the intermediate data includes pixels that are not obtained by the screen processing unit 101 as described above, and thereby cannot be stable enough for an intended image forming apparatus to form dots. In other words, the pixels replaced with input pixel values are expressed by data that is not stable for dot formation.

The dot stabilization unit 104 detects the data area having unstable dots in the intermediate data obtained by the selection unit 103, and replaces the area with data having stable dots.

Operations by the above units are described in more detail.

FIG. 3 illustrates groups of thresholds used by the screen processing unit 101. In FIG. 3, the areas surrounded by the thick lines individually represent a cell of the screen processing, and the numerals in the cell represent the numbers of thresholds respectively. The cell includes 32 values, and the values are binarized based on their own thresholds respectively. Accordingly, the binarization results in a range from a case where all screen pixels have a value of 0 in a cell, to a case where all screens have a value of 1. Therefore, a total of the screen pixel values in the cell ranges from 0 to 32, enabling expression in 33 tone levels.

As described above, the screen processing unit 101 binarizes the input pixel values, but does not output binarized values. The screen processing unit 101 actually outputs values corresponding to the representative quantization values. In other words, the screen processing unit 101 outputs the value 0 for a pixel value less than a threshold, and the value 255 for a pixel value greater than the threshold.

Operations of the density change determination unit 102 is described below in detail with reference to FIG. 2.

The density change determination unit 102 includes a subtraction unit 201, a filter processing unit 202, and a comparison unit 203. The subtraction unit 201 calculates a difference between the input pixel value and the screen pixel value obtained from the screen processing unit 101 for each pixel. The subtraction unit 201 then outputs difference data composed of the difference values for every pixel. The filter processing unit 202 performs filtering on the difference data using the filter illustrated in FIG. 2B, so that the total of the difference values within a local area around a target pixel is calculated as an amount of density change of the target pixel. The amount of density change corresponds to a low-frequency component in the difference between the input image data and the screen image data.

Figures 2B, 2C:
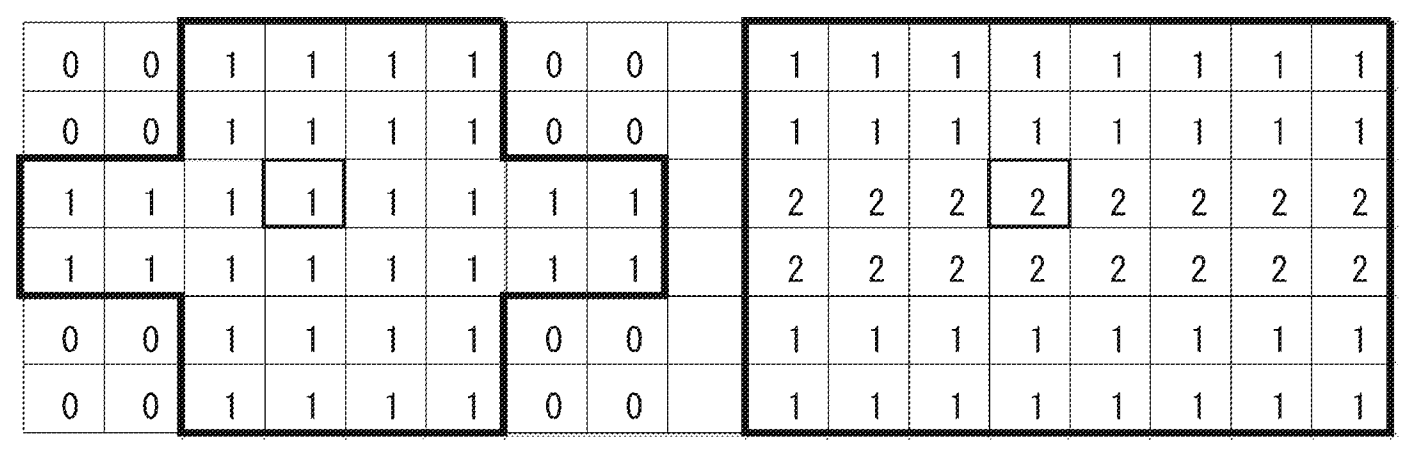

The filter illustrated in FIG. 2B has a size appropriate for the cell having a group of the thresholds in FIG. 3 that is used by the screen processing unit 101. In other words, the filter in FIG. 2B is configured to obtain the total of the pixel values in a cell (The pixel circled by the small square in FIG. 2B is the target pixel.) The filter processing unit 202 sets coefficients such that the totals of the coefficients for the groups of the same thresholds in the screen processing are equal to each other.

For example, in the case where a cell within the groups of thresholds in FIG. 3 (the area surrounded by the thick line) is processed using a 6×8 tap filter, the filter coefficients in FIG. 2C are used, which produce an output that is twice as large as that in the case using the filter illustrated in FIG. 2B. Accordingly, in order to obtain the result having the weight equal to that using the filter in FIG. 2B, the output from the filter illustrated in FIG. 2C needs to be reduced by half.

Even when, the cells in the thresholds in FIG. 3 (i.e., the areas surrounded by the thick lines) can be translated in parallel to the right side by one column, no overlapping of threshold values occurs among the cells, maintaining the 32 thresholds in each cell. Thus, when input image data that represents pixels corresponding to a cell is uniform, the total of the difference values between the input pixel values and the screen pixel values within the cell (i.e., an amount of density change) is supposed to be no more than an amount of quantization error (in the present exemplary embodiment, the quantization error is from −128 to 127). However, sometimes, the amount of density change exceeds the amount of quantization error. This is because density change that is not present in the input image data occurs in the screen image data. Such density change that is not present in the input image data generates moiré which is visually troublesome.

The comparison unit 203 compares the amount of density change of the target pixel to a threshold TH1. When the amount of density change exceeds the threshold TH1, the comparison unit 203 determines that the target pixel has moiré generated by the screen processing. After the determination, the comparison unit 203 performs control such that the selection unit 103 selects an input pixel value as an intermediate pixel value of the target pixel. When the amount of density change is equal to or smaller than the threshold TH1, the comparison unit 203 determines that the target pixel has no moiré generated by the screen processing. The comparison unit 203 then performs control such that the selection unit 103 selects a screen pixel value obtained from the screen processing unit 101 as an intermediate pixel value of the target pixel.

As described above, every threshold is maintained within a cell even after parallel translation of the cell, and the density change determination unit 102 can perform processing for every pixel. In a gradation image, the input image data representing a cell area is not uniform, and may generate a difference more than an amount of quantization error. Even so, no moiré is generated in the gradation image because it does not have high frequency components. Therefore, in a gradation image, even when an amount of density change exceeding an amount of quantization error is calculated, output from the screen processing unit 101 is preferably selected. In this case, the threshold TH1 that is used to determine whether there is moiré is preferably a value that is 1.5 to 2 times greater than the amount of quantization error.

Specific operations of the dot stabilization unit 104 are described below.

As described above, the intermediate data includes pixels that are not stable enough for dot formation. Therefore, when an output apparatus forms the dots, some pixels are not well reproduced, leading to output data having an overall lower density than the input image data. Thus, the dot stabilization unit 104 converts the intermediate data into print data that can be output in a stable manner by an image forming apparatus so that any dots that express an image will not be lost due to the pixels which is not binarized (i.e., the pixels replaced with input pixels).

Here, an operation is performed in a pulse width modulation circuit at a subsequent stage (hereinafter, referred to as PWM circuit) (not illustrated) to assure a minimum pulse width. In the pulse width modulation circuit, input image data is modulated to have a pulse width, based on input image data, to generate light emission signals to be output by an image forming apparatus.

When the pulse width determined by the pulse width modulation circuit is not large enough to be output by the image forming apparatus in a stable manner, a resultant image may have missing pixels or lower density than expected. Hence, when in the intermediate data, the intermediate pixel value is too small to be converted into a pulse width sufficient for output, correction needs to be performed on the intermediate pixel value of a pixel having a replaced input pixel value.

Thus, when a target pixel has an intermediate pixel value less than a preset minimum value and there exists one or more pixels around the target pixel that have an intermediate pixel value other than 0, the dot stabilization unit 104 combines the intermediate pixel value to the larger value between the intermediate pixel value of the target pixel and the intermediate pixel values of the pixels around the target pixel to make the intermediate pixel value equal to or greater than the preset minimum value. As a result, the pixel value for the pixel having the combined value becomes 0.

When there exists pixels that are located on the right and left sides of the target pixel and have an intermediate pixel value other than 0, the phase of the PWM circuit may be controlled to provide continuous pulses. In other cases where a target pixel has an intermediate pixel value less than a preset minimum value and there exists no pixel around the target pixel that has an intermediate pixel value other than 0, the intermediate pixel value may be replaced with the minimum value.

In this way, the dot stabilization unit 104 performs processing on the intermediate data to stabilize dots and converts the data into print data. Almost all of the pixels in the intermediate data are quantized by the screen processing, but some pixels having input pixel values still remain. If the dots are formed based on the above intermediate data, dot formation becomes unstable due to the pixels which are not binarized. Accordingly, dot stabilization processing is required. Through the dot stabilization processing, the dot stabilization unit 104 converts the input pixel values of some pixels into data that can be used for dot formation by an image forming apparatus in a stable manner.

Through the above processing, the dot stabilization unit 104 calculates image data that can be output without moiré caused by the screen processing and that can form stable dots.

According to the present exemplary embodiment, pixels appropriate for the screen processing and those inappropriate for the screen processing are determined. The intermediate data without moiré caused by the screen processing is obtained by replacing the screen pixel values of the inappropriate pixels with input pixel values. The intermediate data is given a stable screen data structure having no moiré, by the screen processing unit 101. Since the pixels that highly possibly have moiré are replaced with input pixel values, a subtracter is unnecessary. As a result, print data can be obtained by a simple circuit without change of a range between before and after the processing for eliminating moiré generated by the screen processing unit 101.

In addition to moiré, discontinuity of thin lines and jaggies of edge areas occur due to interference between input images and the screen processing. In other words, the moiré due to the screen processing occurs mainly in the edge area of an image. Thus, in the intermediate data in the present exemplary embodiment, eventually, the pixels having replaced input pixel values are located mainly on the edge area. In the present exemplary embodiment, a process to obtain stable dot formation is performed on the pixels having the replaced input pixel value.

As described above, in order to prevent missing of information due to pixels in intermediate data that may cause poor dot reproducibility, the unstable data for dot formation is replaced with print data that provides good dot reproducibility. Thus, good result of halftone processing is obtained by calculation, while maintaining stable screen data structure and preventing moiré.

In addition, the above processing does not require any complicated configuration to select an appropriate halftone processing, nor generates any discontinuous images due to unnecessary switching of halftone processing.

A second exemplary embodiment of the present invention is described below. In the above exemplary embodiment, the configuration is described in which a density change is determined for each pixel in terms of quantization error in the screen processing. In the second exemplary embodiment, as an example, a density change is determined for each pixel in terms of feature quantity in a cell having a group of thresholds used by the screen processing unit 101.

Figure 4:
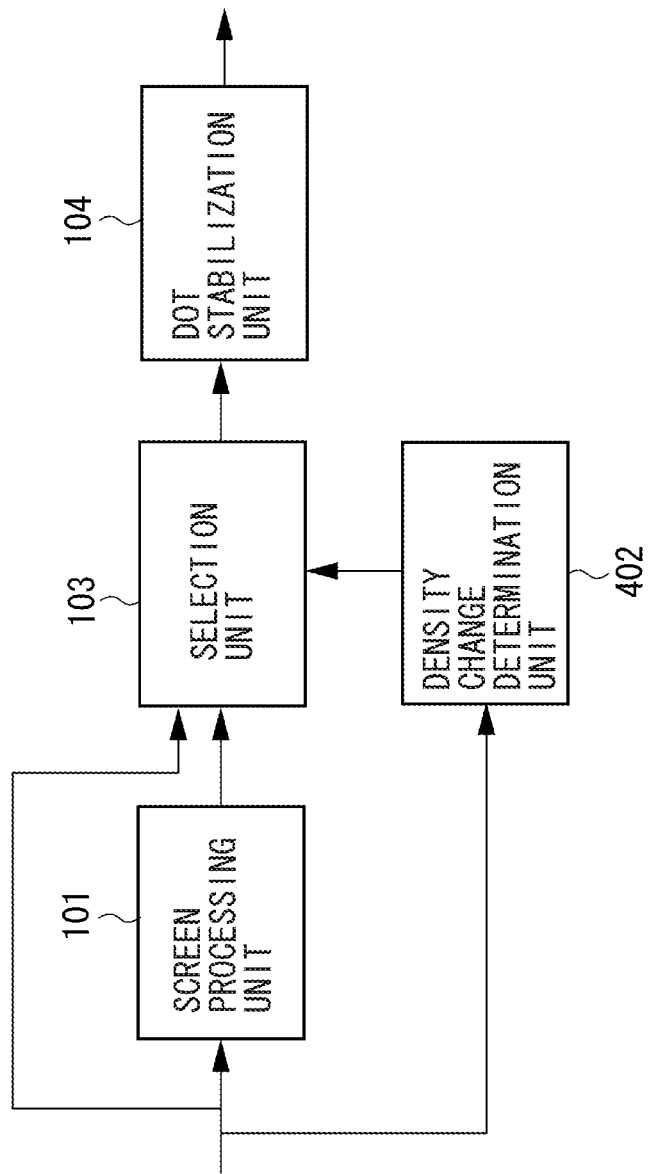
FIG. 4 is a block diagram illustrating a structure of an image processing unit.

FIG. 4 illustrates a structure of an image processing unit that is applicable to the second exemplary embodiment. The elements that operate in a similar manner to the first exemplary embodiment are denoted with the same reference numerals, and are not described. The following describes operations of a density change determination unit 402 in the second exemplary embodiment.

Figure 5:
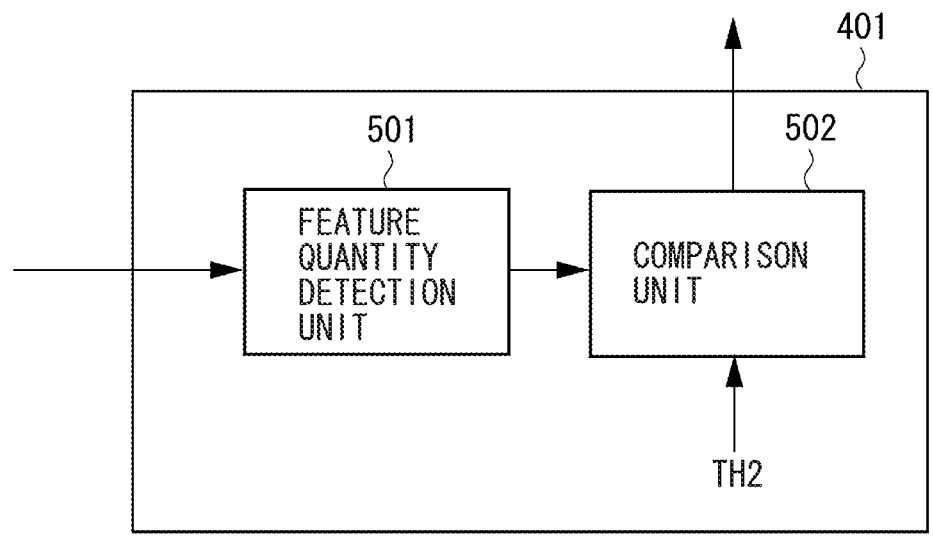
FIG. 5 is a block diagram illustrating in detail the density change determination unit in FIG. 2.

FIG. 5 illustrates in detail a structure of the density change determination unit 402. A feature quantity detection unit 501 detects feature quantity in a cell. More specifically, a known Laplacian filter is used for example, to detect an amount of edge of each pixel, and the absolute values of the amounts of edges in the cell are accumulated. In this way, the feature quantity detection unit 501 calculates an accumulated amount of edges in a target cell.

A comparison unit 502 compares the accumulated amount of edges with a threshold TH2. When the accumulated amount of edges exceeds the threshold TH2, the comparison unit 502 determines that a density change (i.e., moiré) may be generated by the screen processing in the target cell, and controls the selection unit 103 to select an input pixel value, for each pixel, as an intermediate pixel value that expresses a pixel in the cell.

When the accumulated amount of edges is equal to or less than the threshold TH2, the comparison unit 502 determines that a density change (moiré) will not be generated by the screen processing in the target cell, and controls the selection unit 103 to select a screen pixel value obtained from the screen processing unit 101, for each pixel, as an intermediate pixel value that expresses a pixel in the processing target cell.

A maximum value in the absolute values of the amounts of edges in the cell may be detected as the feature quantity. Alternatively, the feature quantity to be detected may be a dynamic range (i.e., maximum value–minimum value) in the cell. In the latter case, a dynamic range can be detected only through pixels in the cell, leading to a more simplified circuit.

Any feature quantity other than the above examples may be applicable to the present exemplary embodiment as long as they enable detection of flat areas (or density change) in a cell.

As described above, in the second exemplary embodiment of the present invention, evaluation of feature quantity in a cell leads to elimination of moiré generated by the screen processing through a simple process. Usually, the feature quantity such as an amount of edge can be commonly used in another image processing. Further, data replacement on a cell basis leads to a more simplified circuit.

In the dot stabilization processing in the first exemplary embodiment, the configuration that assures a minimum pulse width in a PWM circuit was described. In a third exemplary embodiment, an example is described in which dot stabilization processing is performed according to pixel feature. The elements in the third exemplary embodiment are the same as those in the first exemplary embodiment, except the dot stabilization unit 104 in FIG. 1. Hence, in the third exemplary embodiment, only operations of the dot stabilization unit 104 are described, and other elements are not described.

Figure 6:
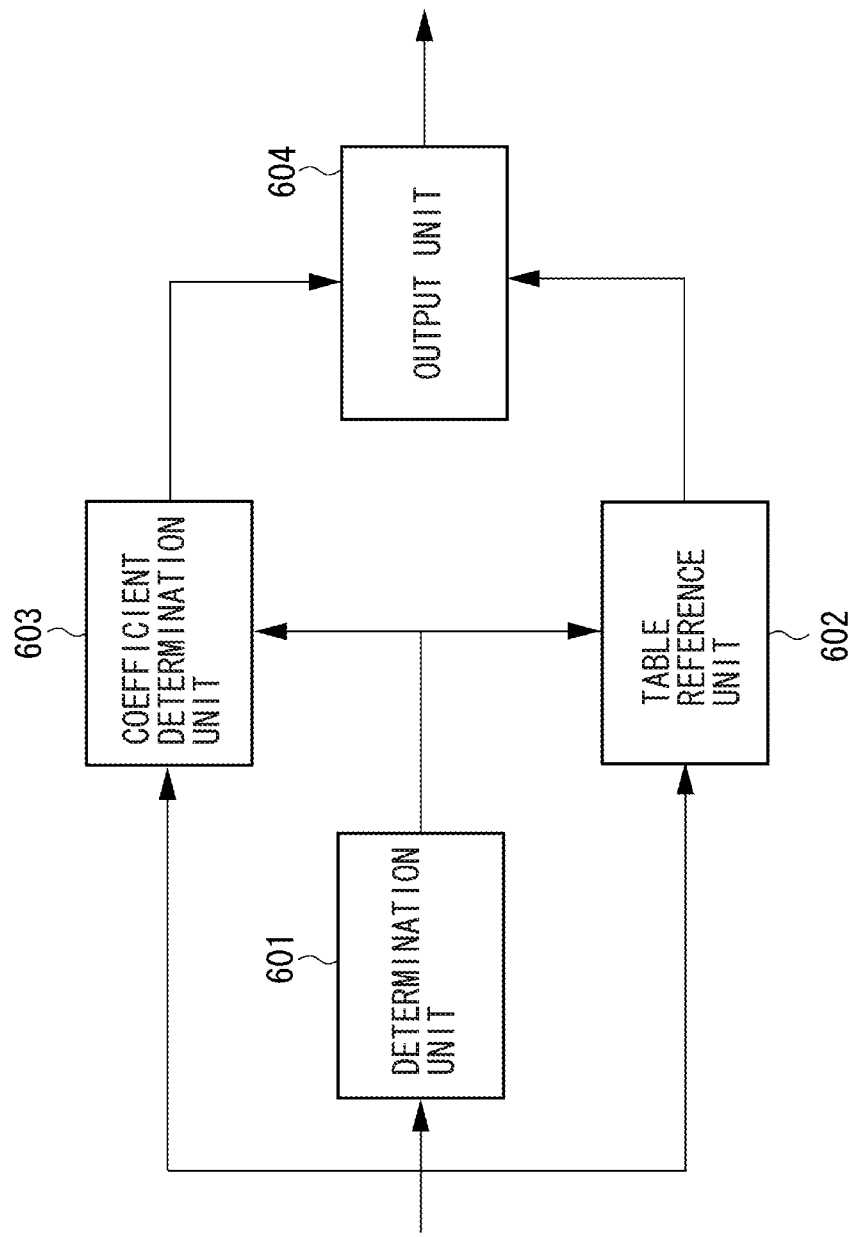
FIG. 6 is a block diagram illustrating in detail a dot stabilization unit according to a third exemplary embodiment.

FIG. 6 illustrates in detail a structure of the dot stabilization unit 104 that is applicable to the third exemplary embodiment. The dot stabilization unit 104 includes a determination unit 601, a table reference unit 602, a coefficient determination unit 603, and an output unit 604. The determination unit 601 determines pixel feature of intermediate data input thereto.

The table reference unit 602 selects one or more tables according to the feature quantity output from the determination unit 601. The tables are generated based on the characteristics determined by PWM values and output densities (hereinafter, referred to as PWM characteristic). Depending on the feature of an image, the coefficient determination unit 603 of an image forming apparatus determines weighting coefficients by using the selected tables. Subsequently, the output unit 604 performs additions with the determined weight, and outputs it as stable PWM values. The processing flows as described above.

Specific operations of each element are described below.

The determination unit 601 detects image features of pixels that are not binarized in an input image (i.e., the pixels replaced with input pixel values). In the present exemplary embodiment, the image feature is categorized as three images: solid image, line image, and point image. One or two of the images are selected for a target pixel depending on the feature of the pixel. More specifically, an average weighted value of pixels around a target pixel is calculated, and a determination is made based on a magnitude relation between the target pixel and the resultant average weighted value.

Figure 7:
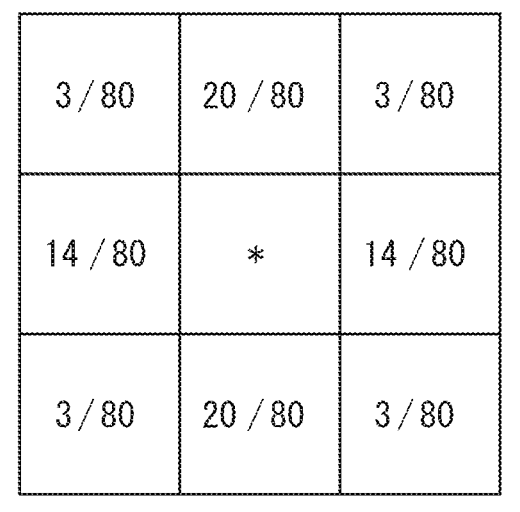

FIG. 7 illustrates a filter used to calculate the average weighted value. The filter contains weights that are set in consideration of PWM influence of surrounding pixels on a target pixel. During PWM processing, it is difficult to perform individual exposure processing on a basis of pixel, and the pixel is affected by the pixels around it. Accordingly, determination of PWM characteristic is made based on a target pixel and pixels around it. In the present exemplary embodiment, a 3×3 area is referred to as the pixels around a target pixel, but the area is not limited to that area, and an area of a different size may be used as a reference area.

The magnitude relation thus obtained between the resultant average weighted value and a target pixel is used to determine the feature of a target pixel. More specifically, cases are split as follows, wherein D is a pixel value of a target pixel, and AVE is a calculated average weighted value, and the result is output as determination data. At the same time, the calculated average weighted value AVE is also output.

(0) Case with D≤AVE: the density of the pixels around the target pixel is larger than that of the target pixel, and it is determined that the image has a solid image feature. The value "0" is output as determination data.

(1) Case with D/2≤AVE<D: the density of the pixels around the target pixel is slightly smaller than that of the target pixel, and it is determined that the image has characteristics from solid image to line image. The value "1" is output as determination data.

(2) Case with AVE<D/2: the density of the pixels around the target pixel is further smaller than that in case (1), and it is determined that the image has characteristics from line image to point image. The value "2" is output as determination data.

The table reference unit 602 has tables used to convert a density value into a PWM value for every pixel feature. The table reference unit 602 refers to the tables, using input intermediate data as an address, and outputs obtained results. In other words, in the present exemplary embodiment, the table reference unit 602 refers to three tables: a solid image table, a line image table, and a point image table. A conversion table for associating density values with PWM values can be made by a known method in advance. As one example, density values of images that are printed and output at graduated PWM values are measured and the inverse characteristics of obtained characteristics is put into the form of tables.

Figure 8:
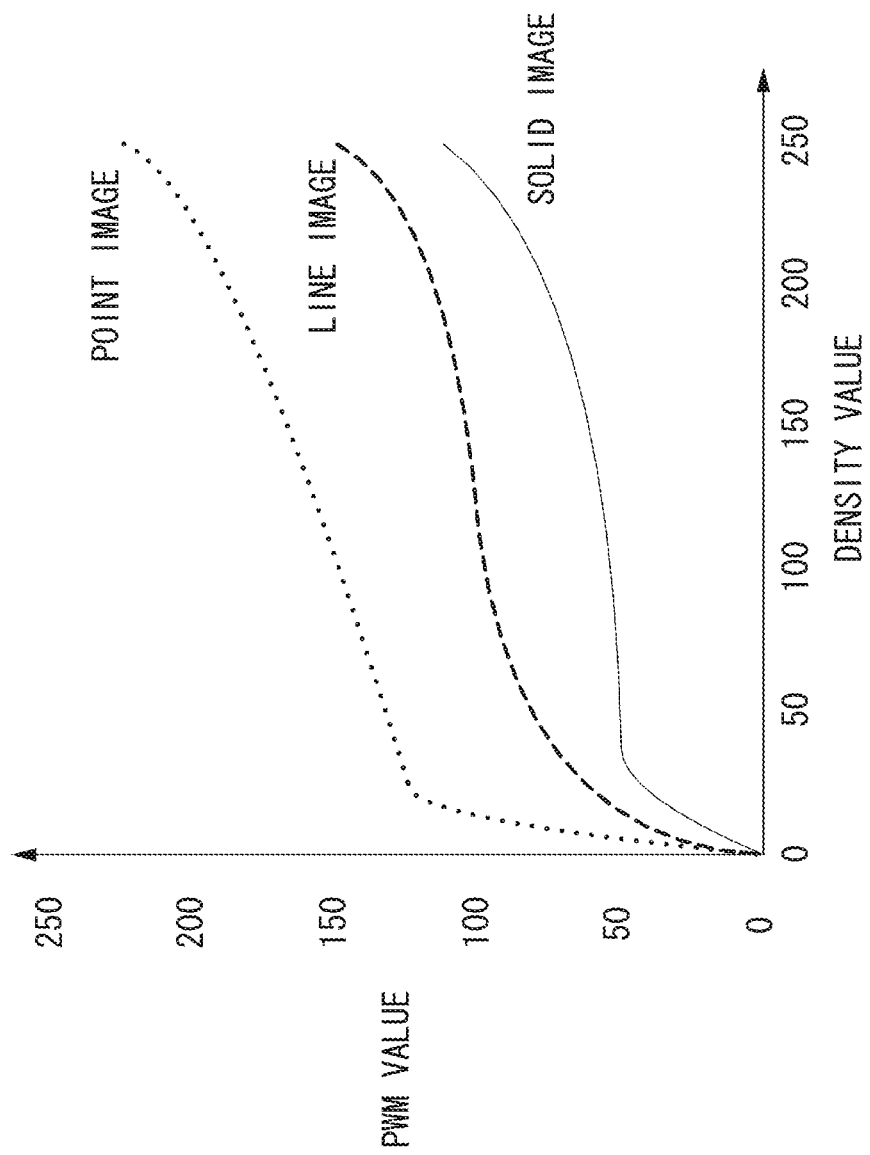
FIG. 8 is an example of a graph illustrating input-output characteristic of three reference tables used in the third exemplary embodiment.

FIG. 8 is an example of a graph illustrating plots for the tables. The graph demonstrates that in a solid image, the density value of 255 can be obtained when a corresponding pixel has a PWM value of about 100. As to a point image which has no black pixel (dot) around a target pixel, a corresponding pixel should have a PWM value of about 220 to obtain the density value of 255, according to the graphs. This is because a point image is not as stable as a solid image, and requires a higher PWM value.

In both cases of the images, when dots are formed with PWM values that are higher than some level, the density gets saturated at a predetermined PWM value, so that output at a maximum PWM value is not necessary to output at a maximum density. As described above, the plots in the graph are not linear, and are different from one another depending on pixel feature, because ease in forming a dot is affected by the dots located therearound.

Selection of tables and reference to them are performed as follows based on the determination data input from the determination unit 601.

(0) In the case of determination data "0": the table reference unit 602 refers to a solid image table, and outputs a table reference value corresponding to a pixel value D of a target pixel (hereinafter, referred to as table reference value).

(1) In the case of determination data "1": the table reference unit 602 refers to a solid image table and a line image table, and outputs table reference values corresponding to a pixel value D of a target pixel, respectively.

(2) In the case of determination data "2": the table reference unit 602 refers to a line image table and a point image table, and outputs table reference values corresponding to a pixel value D of a target pixel, respectively.

The determination data is obtained through reference to tables according to the relationship between a target pixel and pixels around it. The selected tables, however, cannot be necessarily accurate about the density D-PWM characteristics of the target pixel in an input image. Therefore, two different table reference values are used to calculate an appropriate PWM value by interpolation.

The coefficient determination unit 603 determines a weighting coefficient for table reference values, based on the input image data and the determination data obtained from the determination unit 601. Based on the input image data, the determination data obtained from the determination unit 601, and the average weighted value AVE of the pixels around a target pixel, a weighting coefficient is determined as follows, and is output.

(0) In the case of determination data "0": the table reference values of the solid image table are used for calculation. When the average weighted value (AVE) of the pixels around a target pixel is close to a maximum value (e.g., 255 for 8 bits), even if the PWM value for the pixel value D of the target pixel is close to 0, the density of the target pixel becomes high due to the effect of the surrounding pixels. Thus, in such a case, a PWM value that is necessary for output of the maximum density is subtracted from the obtained table reference values, and the resultants are used as data. For example, a value (table reference value−N) is used, wherein N is a PWM value necessary for output of the maximum density.

The weighting coefficients are calculated respectively as follows.

Weighting Coefficient for Table Reference Values= $(255-AVE)/(255-D)$

Weighting Coefficient for Values(Table reference value−N)= $(AVE-D)/(255-D)$

In other words, in the case with AVE=255, only the values (table reference values−N) are used, and in the case where AVE=D, only the table reference values of a solid image table are used.

(1) In the case of determination data "1": The weighting coefficients for table reference values of the solid image table and the line image table are calculated as follows.

Weighting Coefficient for Table Reference Values based on Line Image Table= $(D-AVE)/(D/2)$ Weighting Coefficient for Table Reference Values based on Solid Image Table= $(AVE-D/2)/(D/2)$ In other words, in the case where AVE=D/2, only the line image table is used, and in the case where AVE=D, only the solid image table is used.

(2) In the case of determination data "2": the weighting coefficients for the line image table and the point image table are calculated as follows.

Weighting Coefficient for Table Reference Values based on Point Image Table= $(D/2-AVE)/(D/2)$ Weighting Coefficient for Table Reference Values based on Line Image Table= $AVE/(D/2)$ In other words, in the case where AVE=D/2, only the line image table is used, and in the case where AVE=0, only the point image table is used.

The output unit 604 performs a weighted addition based on one or two inputted table reference values and the corresponding weighting coefficient, and outputs the result. However, in calculation for the case (0) where the determination data is "0", the resultant value may become below 0. In this case, the output unit 604 outputs "0." The output result from the output unit 604 is a calculation result based on values obtained referring to one or more tables for each image feature, and the image data can be used for stable dot formation by an image forming apparatus.

As described above, intermediate data includes mostly the result obtained by the screen processing, therefore it has a screen data structure. Hence, according to the third exemplary embodiment, in order to determine an output value for an unstable pixel in the intermediate data, the values of pixels around a target pixel are referred to, so that dot formation can be performed in a stable manner in further consideration of the formation process of an image forming apparatus.

As described above, in the third exemplary embodiment, appropriate PWM-characteristics tables are selected according to feature of an image, and image data is generated by interpolation processing so that the image data for stable dot formation can be output.

Other Embodiments

The filter processing unit 202 may use any filter so long as a sum of tap coefficients for each of all thresholds used by the screen processing unit 101 is equal. Such a filter can similarly detect moiré.

The selection unit 103 selects a screen pixel value or an input pixel value for each pixel as an intermediate pixel value based on the determination result made by the density change determination unit 102, and outputs intermediate data composed of the intermediate pixel values of the pixels. It can be said that the intermediate data obtained by the selection unit 103 does not have moiré that could occur in the screen image data. However, since screen pixel values are replaced with input pixel values in the pixels determined to have moiré caused by the screen processing, dot formation based on the intermediate data will become unstable due to some pixels which are not binarized. Therefore, the dot stabilization processing is required.

As examples of the dot stabilization processing, in the above exemplary embodiments, a method using PWM processing and a method using density conversion tables have been described. However, the dot stabilization processing is not limited to these methods. More specifically, the error diffusion and the screen processing using a different number of lines or an angle of halftone dots different from the screen processing by the screen processing unit 101 may be used. In the dot stabilization unit 104, it is only required to perform processing for combining a pixel that cannot reproduce a dot, with a stable dot around it, or combining to form a stable dot. With respect to any remaining pixel that cannot reproduce a dot, its value may be converted into a minimum value that allows reproduction of a dot. These processes prevent degradation of image due to missing information and discontinuity of thin lines, while minimizing difference in density from that of input image data.

The present invention can also be achieved by supplying a non-transitory computer readable storage medium storing a program code of the software that implements the functions of the above exemplary embodiments, to a system or an apparatus. In this case, the system or the apparatus includes a computer (or Central Processing Unit (CPU) or Micro Processing Unit (MPU)), and the computer reads the program code stored in the storage medium in a computer-readable manner, and implements the software to perform the functions of the above exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-150892 filed Jul. 7, 2011, which is hereby incorporated by reference herein in its entirety.

What is claimed is:

1. An image processing apparatus that converts input image data into printable image data, comprising:
   a screen processing unit configured to perform screen processing on the input image data;
   a determination unit configured to determine whether moiré occurs in screen image data generated by the screen processing unit for a target pixel in the input image data;
   an output unit configured to output, depending on the determination result made by the determination unit, one of a screen pixel value in the screen image data for the target pixel and a value obtained by converting an input pixel value into a printable pixel value based on intermediate data, as a value of the target pixel in the printable image data, the intermediate data being generated by replacing a screen pixel in the screen image data that is determined to have moiré by the determination unit with the input pixel value in the input image data;
   a selection unit configured to select the input pixel value from a pixel that is determined to have moiré by the determination unit, in the screen image data; and
   a conversion unit configured to convert intermediate data obtained from the selection unit into the printable pixel value.

2. The image processing apparatus according to claim 1, wherein the determination unit determines the occurrence of moiré based on information that indicates a low-frequency component in a difference between the screen image data and the input image data.

3. The image processing apparatus according to claim 2, wherein the determination unit obtains the information by calculating a difference between a low-frequency component of the screen image data and a low-frequency component of the input image data.

4. The image processing apparatus according to claim 2, wherein the determination unit obtains the information by performing filtering process on the difference between the input image data and the screen image data.

5. The image processing apparatus according to claim 4, wherein the determination unit performs the filtering process using a filter having an equal sum of tap coefficients for every threshold used by the screen processing unit.

6. The image processing apparatus according to claim 1, wherein the determination unit makes the determination based on a feature of the input image data.

7. The image processing apparatus according to claim 6, wherein the determination unit makes the determination based on one of a sum of absolute values of edge amounts of pixels corresponding to a cell of the screen processing unit and a maximum value of the absolute values of the edge amounts in the input image data.

8. The image processing apparatus according to claim 6, wherein the detection unit makes the determination based on a dynamic range of pixels corresponding to a cell of the screen processing unit, in the input image data.

9. The image processing apparatus according to claim 1, further comprising: a PWM processing unit configured to perform PWM processing on output data obtained by the output unit.

10. The image processing apparatus according to claim 1, wherein when the target pixel has a pixel value less than a predetermined value and there exists a pixel around the target pixel that has been replaced with an input pixel value other than 0 in the intermediate data, the pixel value is combined to one of the target pixel and the pixel around the target pixel such that the pixel value becomes equal to or exceeds the predetermined value.

11. The image processing apparatus according to claim 1, wherein the conversion unit performs error diffusion processing.

12. The image processing apparatus according to claim 1, wherein the conversion unit collects a plurality of pixel values for which the input pixel value is selected, and converts the collected pixel values to a value equal to or greater then a minimum value at which a dot can be formed.

13. The image processing apparatus according to claim 1, wherein the conversion unit includes:
   a detection unit configured to detect a feature of the target pixel based on the target pixel and pixels around the target pixel;
   a table reference unit configured to select a table indicating output characteristics corresponding to the feature detected by the detection unit, and to output a value corresponding to an input pixel value of the target pixel;
   a coefficient determination unit configured to determine a coefficient of a value corresponding to the input pixel value of the target pixel according to the feature detected by the detection unit; and
   an output value determination unit configured to perform weighted addition based on the value corresponding to the input pixel value of the target pixel and the coefficient, and determine an output value.

14. The image processing apparatus according to claim 1, wherein the detection unit detects a feature of an image based on a magnitude relation between an input pixel value of the target pixel and an average weighted value of input pixel values of pixels around the target pixel.

15. A non-transitory computer readable medium containing a program that causes a computer to function as the units of the image processing apparatus according to claim 1.

16. An image processing method for converting input image data into printable image data, the method comprising:
   performing screen processing on the input image data by a screen processing step;
   determining by a determination step whether moiré occurs in screen image data generated by the screen processing step for a target pixel in the input image data;
   outputting by an output step, depending on the determination result made by the determination step, one of a screen pixel value in the screen image data for the target pixel and a value obtained by converting an input pixel value into a printable pixel value based on intermediate data, as a value of the target pixel in the printable image data, the intermediate data being generated by replacing a screen pixel in the screen image data that is determined to have moiré by the determination step with the input pixel value in the input image data;

selecting the input pixel value from a pixel that is determined to have moiré, in the screen image data; and converting the intermediate data into the printable pixel value.

17. A non-transitory computer readable medium containing instructions for performing the method according to claim 16.

18. The method according to claim 16, wherein the determination step further comprises:

comparing the input pixel value to an average weighted value of the pixels around the input pixel not including the input pixel to identify the input pixel as one of a plurality of features.

19. The method according to claim 18, wherein a particular table is associated with each of the plurality of features, wherein each table associates density values with PWM values, and the particular table is used to output a value corresponding to the input pixel value.

* * * * *